W. S. LIVENGOOD.
BALING PRESS.
APPLICATION FILED OCT. 10, 1911.
1,056,919.
Patented Mar. 25, 1913.
5 SHEETS—SHEET 4.
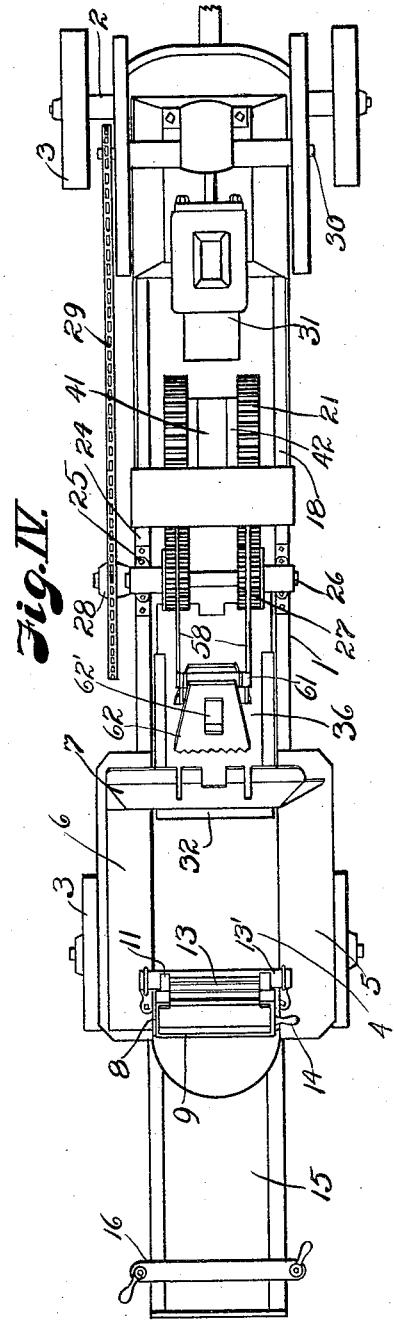
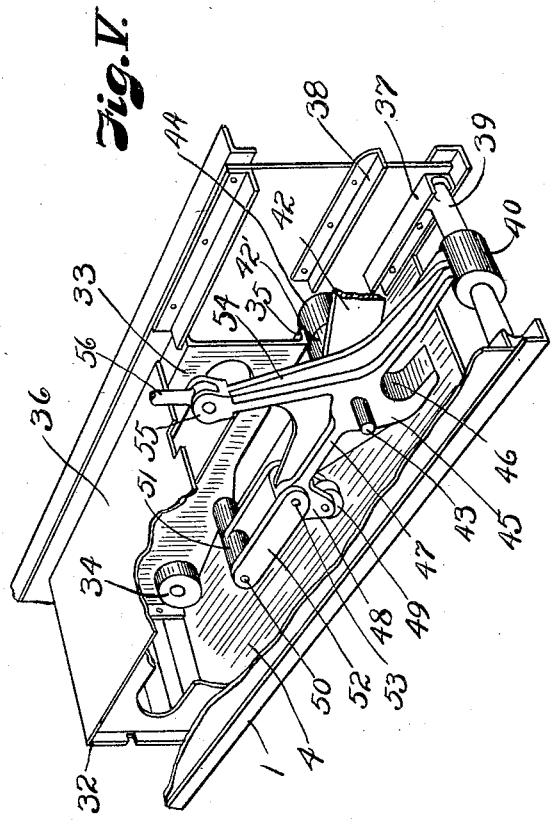
WITNESSES:
Arthur W. Caps.
INVENTOR.
W. S. Livengood.
BY
ATTORNEY.

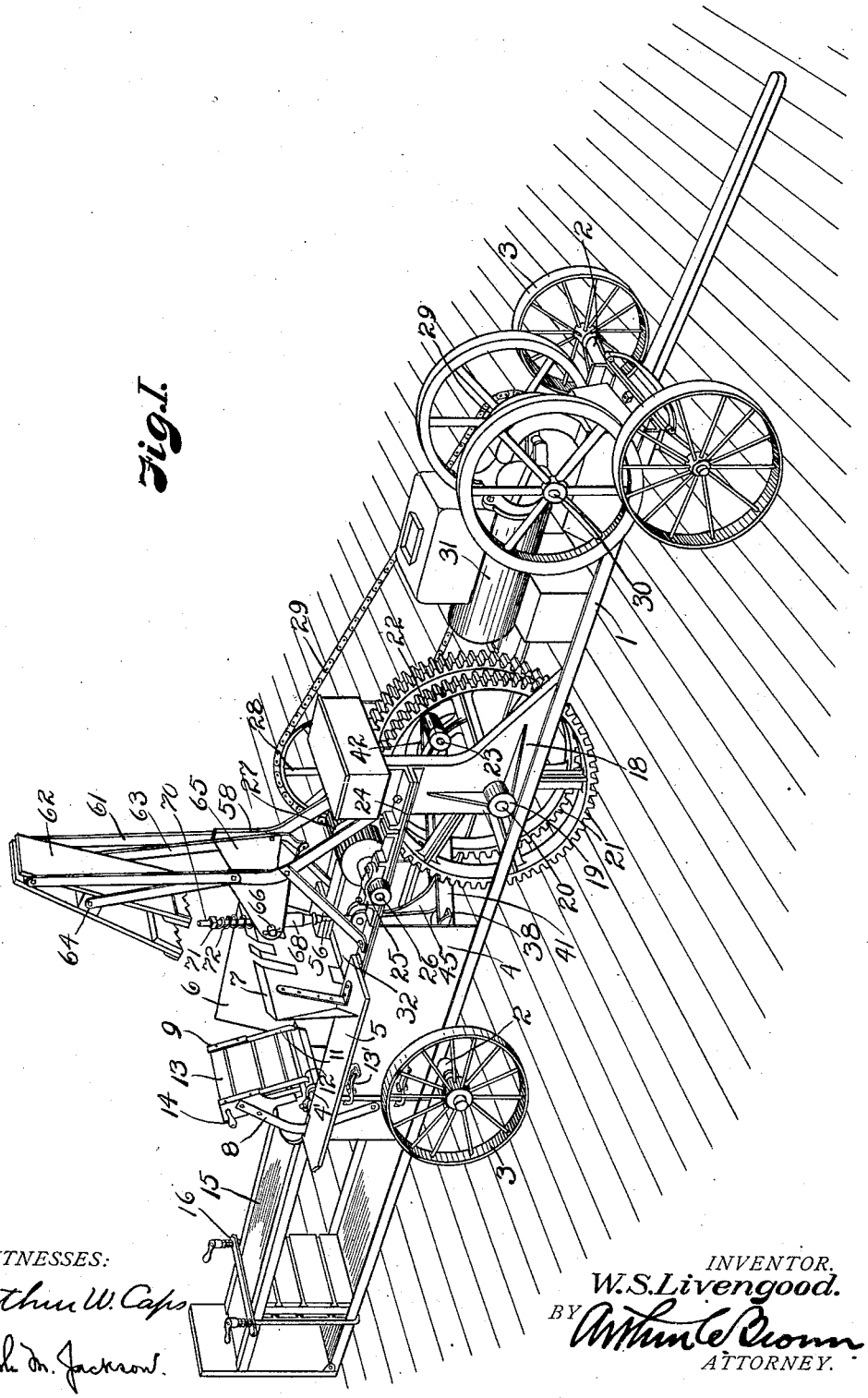

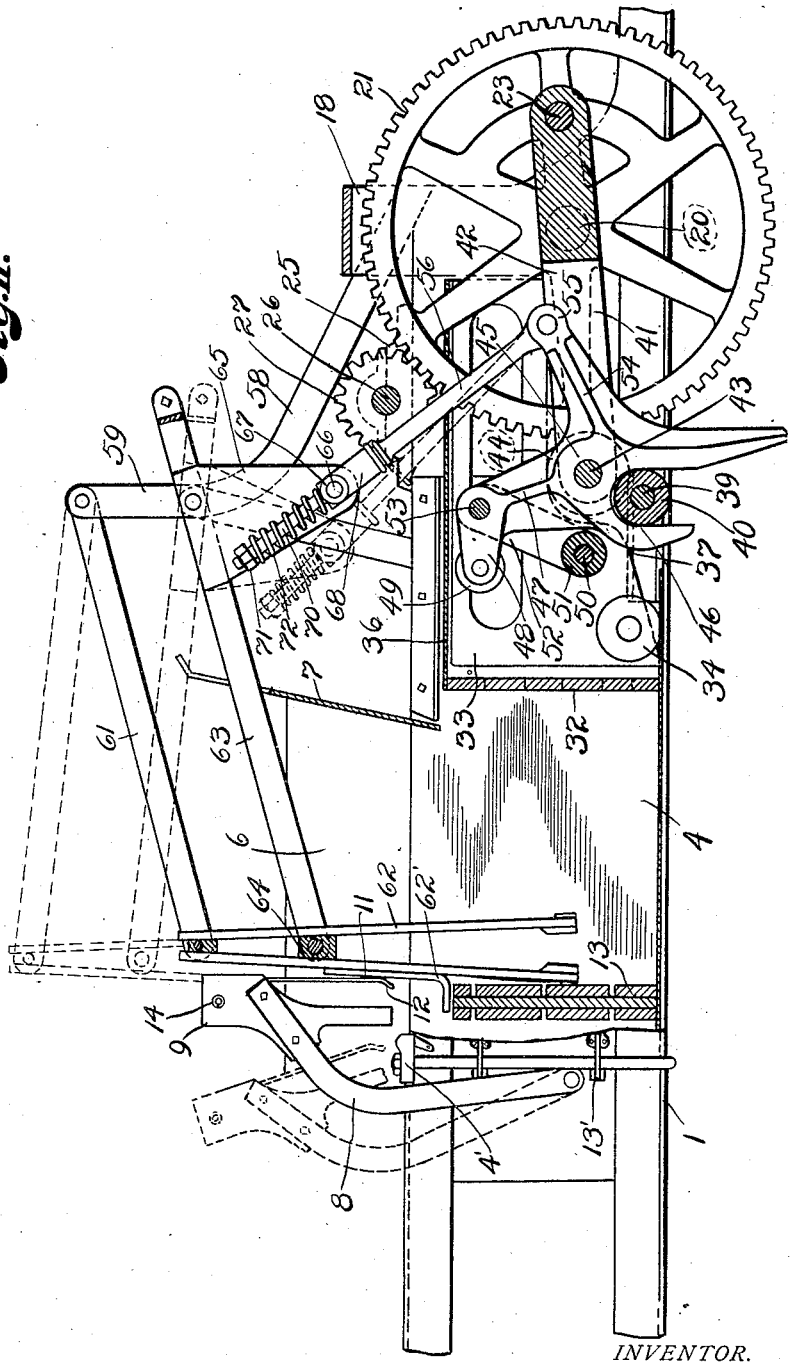

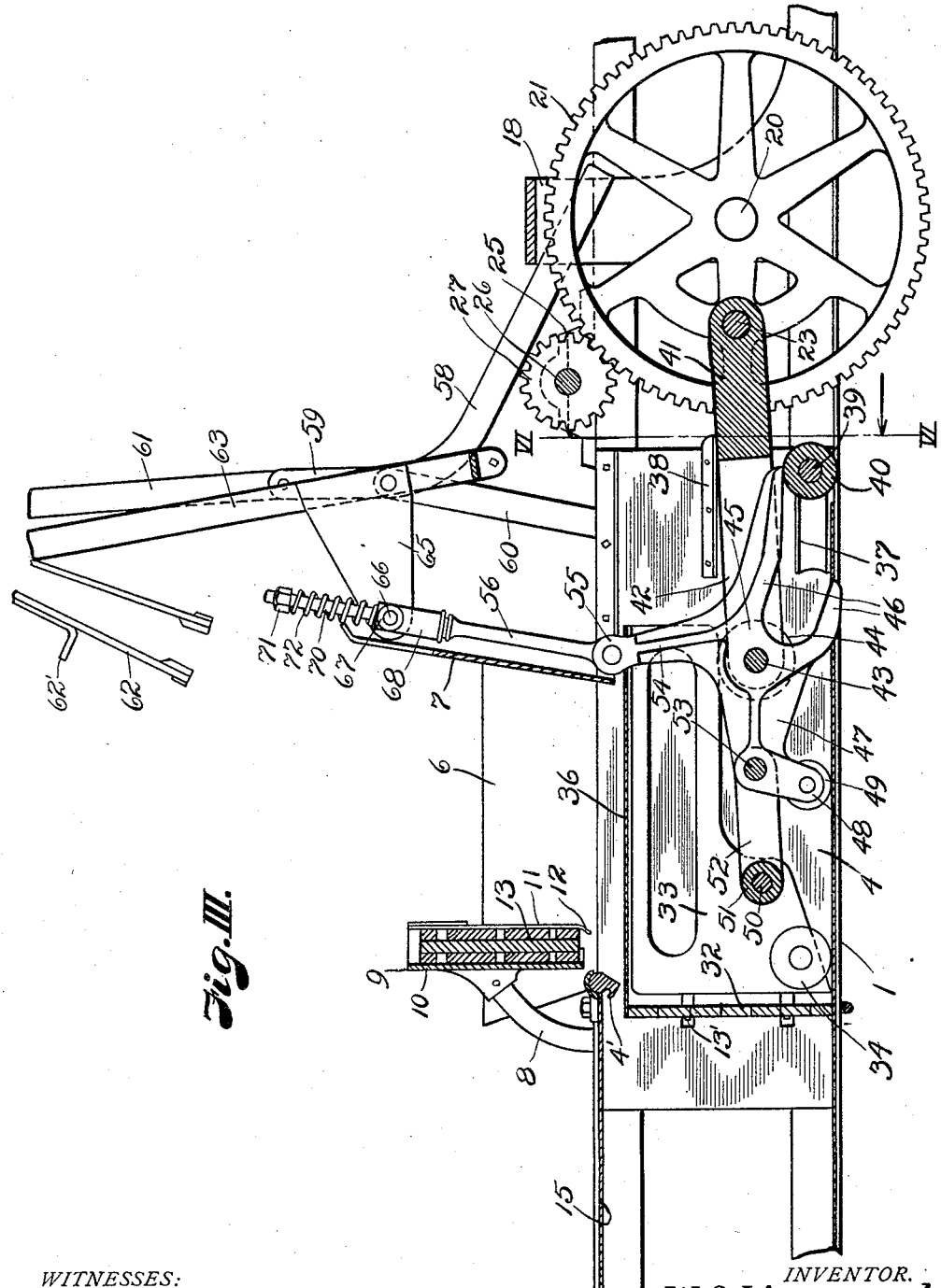

W. S. LIVENGOOD.
BALING PRESS.
APPLICATION FILED OCT. 10, 1911.
1,056,919.
Patented Mar. 25, 1913.
5 SHEETS—SHEET 5.
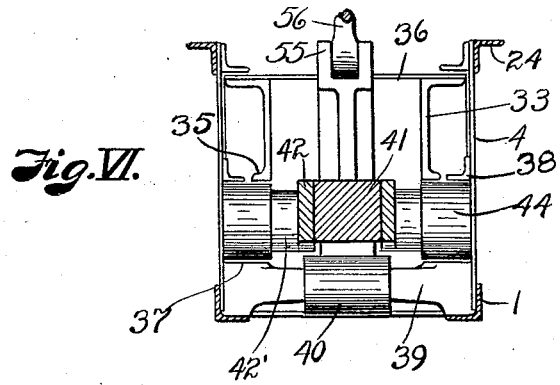
Fig. VI.
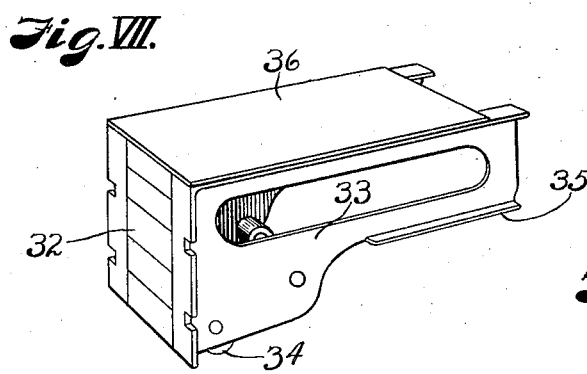
Fig. VII.
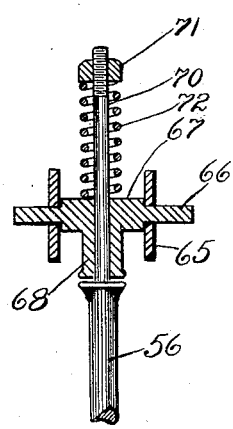
Fig. X.
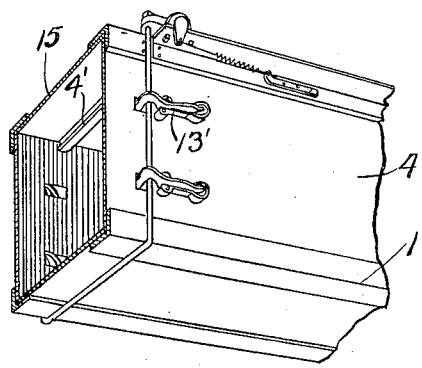
Fig. VIII.
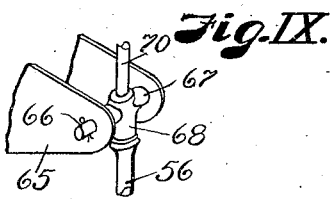
Fig. IX.
WITNESSES:
Arthur W. Caps.
Myrtle M. Jackman.
INVENTOR.
W. S. Livengood.
BY Arthur C. Brown
ATTORNEY.

UNITED STATES PATENT OFFICE.

WINFIELD S. LIVENGOOD, OF KANSAS CITY, MISSOURI, ASSIGNOR, BY MESNE ASSIGNMENTS, TO MISSOURI HAY PRESS COMPANY, OF MOBERLY, MISSOURI, A CORPORATION OF MISSOURI.

BALING-PRESS.

1,056,919.  Specification of Letters Patent.  Patented Mar. 25, 1913.

Application filed October 10, 1911. Serial No. 653,816.

*To all whom it may concern:*

Be it known that I, WINFIELD S. LIVENGOOD, a citizen of the United States, residing at Kansas City, in the county of Jackson and State of Missouri, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to baling presses, and more particularly to a self-feeding press, wherein charges of hay, or other material, are automatically forced into the baling chamber at proper periods relative to the operation of the plunger, the principal object of the present invention being to provide improved mechanism for actuating the plunger and feeder head, and particularly to so control the actuation of these parts that the head will remain elevated and inactive during the greater part of the plunger stroke.

It is a further object of my invention to provide mechanism for operating the plunger and feeder head, whereby the first part of the stroke of the plunger and feeder head are rapid, and the last part slow but powerful.

In accomplishing these objects, I have provided the improved details of structure hereinafter described and pointed out in the claims, reference being had to the accompanying drawings, in which:—

Figure I is a perspective view of a baling press constructed according to my invention. Fig. II is an enlarged longitudinal section of the baling chamber and operating parts, the plunger being shown at the back of its stroke, and the feeder head at the limit of its feeding stroke. Fig. III is a similar view, showing the plunger at the front of its stroke, and the feeder head in elevated position. Fig. IV is a plan view of the parts shown in Figs. II and III. Fig. V is a perspective view of the walking crank for actuating the plunger and feeder head, with its guiding tracks. Fig. VI is a cross section of same on the line VI—VI, Fig. III. Fig. VII is a detail perspective of the compression plunger. Fig. VIII is a similar view of the rear end of the baling chamber. Fig. IX is a perspective view of the crank link and its mounting on the feeder frame. Fig. X is a sectional view of same.

Referring more in detail to the parts:— 1 designates a bed frame, preferably of skeleton formation and composed of angle iron, which extends throughout the length of the press and is preferably supported on running gears, comprising axles 2 and ground wheels 3.

Mounted on frame 1 is a baling chamber 4, which is open at the top and ends and is provided with a feeding board 5 at one upper side edge, a hopper plate 6 opposite the feeding board, a back hopper plate 7, division board stop 13' and tuckers 4'.

Pivotally mounted on the sides of the baling chamber, at the front, are forwardly curved arms 8, which carry a division board frame 9 having a solid back 10 and front leaf springs 11, the latter being arranged at the edges of the frame and provided with inturned lips 12 at the bottom. 13 designates a division board which is yieldingly supported in the frame by the pressure of the springs, and the lips 12. On one edge of the frame is a handle 14 by which it may be rocked on its pivotal mounting, as will presently be more fully described.

Extending forwardly from the upper portion of the baling chamber is a plate 15, which is tensioned downwardly toward the base by a screw frame 16, in order to compress a bale after its delivery from the chamber.

The bed frame, forwardly of the baling chamber, is open, and rising from the sides of the frame are standards 18, having shaft bearings 19. Mounted in bearings 19 is a shaft 20, which carries a pair of large gear wheels 21, said wheels being spaced apart and provided with eccentrically arranged, registering bearings 22, which carry a shaft 23.

Mounted on the baling chamber 4 and standards 18 are rails 24, having bearings 25. Journaled in bearings 25 is a shaft 26, having gears 27 meshing with the large gears 21, and provided with a sprocket wheel 28.

29 designates a chain belt which is run over sprocket wheel 28 and over a sprocket wheel 29' on the shaft 30 of an engine 31, which is carried on the rear end of the bed frame and furnishes power for the baling and feeding mechanisms.

32 designates the plunger head, which is adapted for reciprocation within the baling chamber, and has rearwardly projecting side members 33, provided with rollers 34 for traveling on the floor of the chamber, to facilitate the travel of the parts, the lower portions of the side members being cut away at the rear and provided with laterally turned flanges 35. These side members carry a plate 36 that prevents the deposit of material back of the plunger when the machine is in operation.

Fixed to the sides of the baling chamber, near the rear, are the tracks 37 and spaced guides 38, which latter lie substantially parallel with, but outside of the path of the plunger side members. Extending across the rear end of the chamber, and preferably rigidly mounted on the tracks 37, is a cross member 39, upon which a roller 40 is revolubly mounted.

Pivotally mounted on the pin 23 which is carried on the large gears 21, is a split pitman 41, the arms 42 of which have hubs 42' at their forward ends. Extending through the forward ends of the pitman arms and through the hubs is a shaft 43, and revolubly mounted on the ends of said shaft are rollers 44, which are adapted for traveling on the tracks 37 beneath the guides 38, and for supporting the plunger sides 33.

Pivotally mounted on the central portion of shaft 43 is a walking crank 45, having a socket arm 46 adapted for receiving the stationary roller 40 at the rear of the baling chamber; the lower member of the arm being downwardly offset from the crank mounting, so that when the crank is moved rearwardly it will be turned over the roller (Fig. II), and the upper member of the arm being slightly offset and extended so that it will still engage the roller from above when the plunger is at the forward limit of its travel (Fig. III). Extending from the body of the crank, in substantial alinement with the upper member of arm 46, is a toggle arm 47, having an offset yoke 48 provided with a roller 49. Fixed to the plunger sides is a shaft 50, and pivotally mounted on the shaft is a collar 51, having links 52 extending to and pivotally mounted on a pin 53 on the toggle arm 47.

Projecting from the body of the crank, at substantially a right angle to the arms 46 and 47, is a feeder arm 54, having a yoke 55 therein, wherein the rod 56 for operating the feeder head is pivotally mounted.

Fixed to the standards 18 are bars 58, having upturned ends 59 located over the rear end of the baling chamber and braced by bars 60, which rise from the rails 24. Pivotally mounted on the ends of bars 58 are links 61, which are also pivotally connected with the upper end of the feeder head 62. Pivotally mounted on the bars 58, below the link connections, are levers 63, the rear ends of which project rearwardly of the bars and are preferably united, and the forward ends of which are pivotally connected with a spacer block 64 located between the members of the head 62.

Fixed to the levers 63 and extending forwardly thereof when the feeding head is elevated, are plates 65, and pivotally mounted in the ends of plates 65 are the stubs 66 of a rock shaft 67, having a boss 68.

The rod 56 is pivotally mounted in the yoke 55 on the end of the crank arm 54 and has a shank 70 projected through a boss in the rock shaft 67, said rod also having a shoulder adapted for abutment against the end of the boss to limit the travel of the rod.

The end of shoulder carries a nut 71, and interposed between the nut 71 and shaft 67 is a spring 72 for providing a yielding support for the rod.

The feeder head is provided with a lip member 62' for engaging a division board in the carrier, to automatically move same into the baling chamber.

In using the press, presuming the motor to be in operation and to have moved the parts to the position shown in Fig. II, i. e. with the plunger retracted and the feeder head within the baling chamber, a continued revolution of the large gears 21 will force the pitman 41 forwardly, exerting pressure on the walking crank above the stationary roller 40. When this pressure is exerted the long member of the socket arm will hold against the roller, causing the crank to turn, with the roller as its pivot, thereby raising the arm 54 to lift the feeder head out of the baling chamber and lowering the arm 47 and straightening the toggle, comprising the arm and links 52. The straightening of the toggle forces the plunger rearwardly, and continued revolution of the large gear wheels moves the crank around its pivot until the socket arm is free to leave the roller. The crank is then moved forwardly by the pitman, the lower member of the arm 46 and the roller 49 traveling on the bottom of the baling chamber, and the rear ends of the plunger sides being supported on the rollers 44 on the shaft 43. As the crank 45 is turned on its forward stroke, arm 54 lifts the rod 56 and forces the feeder arms 61 and 63 around on their pivotal mounting, to lift the feeder head; the initial movement of the rod tending to move the plates to vertical position and lifting the feeder head in substantially a perpendicular plane and with a rapid movement, in order that the head may clear the baling chamber before the plunger compresses the loose hay thereagainst, the relative action of the arm 54 and the toggle being such that the feeder head is completely removed from the baling chamber before any effective compression is produced by the plunger, owing partly to the fact, the hay is loose in the chamber when the plunger is started and the plunger must travel a considerable distance before the hay is condensed to a compact mass. It is apparent that after the arm 54 has attained a vertical position, there will be little movement of the feeder during the forward and back travel of the plunger. When the pitman makes its return stroke, the walking crank is drawn backwardly until the socket arm is moved over the pivot roller 40, when the crank is rocked, lifting the toggle arm to retract the plunger to the backward limit, and simultaneously lowering the arm 54, to lower the feeder head, the downward movement of the head being induced by the rotation of the walking crank and therefore occurring in a relatively short space of time. As the plunger clears the baling chamber and prior to the lowering of the feeder head a new charge of material is moved into the chamber from the feeding boards so that when the head descends it will force same into the chamber. Just prior to the pivotal action of the crank, the pitman rollers 44 pass between tracks 37 and guides 38, so that vertical movement of the crank is obviated.

By providing the feeder head with the lip 62', and pivoting the division board carrier, a board may be fed into the baling chamber by placing same in the carrier and moving the latter into the path of the lip on the feeder heads, so that the lip will engage the board on a down stroke and force same from the carrier into the chamber.

By providing the yielding connection between the crank and feeder, should too great a quantity of material be fed into the baling chamber, the spring in the connection will yield and thereby obviate damage to the feeder parts.

Having thus described my invention, what I claim as new therein and desire to secure by Letters-Patent is:—

1. In a baling press, a crank member having a toggle arm and a bifurcated trip arm, a plunger connected with the toggle arm, a stationary pivoting member, over which the members of the trip arm are adapted for travel to rock the crank at both forward and back movement of the plunger, and means for actuating said crank.

2. In a baling press, a plunger, a reciprocatory crank, a pitman connected with the crank, an arm on the crank offset from the pitman connection, and provided with a socket, and a member fixed in the path of the socketed arm and adapted for engagement thereby upon the back thrust of the crank, for rotating the crank and retracting said plunger.

3. In a baling press, a plunger, a reciprocatory crank, a socket arm on said crank, a fixed pivoting member located in the path of the socket arm and adapted for constant engagement by one of the members thereof, and means for reciprocating said crank.

4. In a baling press, a reciprocatory crank member having a toggle arm and a bifurcated trip arm having one member in substantially the same plane as the toggle arm and the other member in a plane spaced therefrom, a plunger connected with the toggle arm, and means for actuating the crank member, and a pivoting member in the path of the bifurcated trip arm over which the members of said arm are adapted to travel, for the purpose set forth.

5. In a baling press, the combination with a baling chamber, of a rotatable crank, adapted for reciprocatory travel in the chamber, said crank comprising a toggle arm, having a downwardly offset section provided with an anti-friction bearing adapted for travel on the floor of the baling chamber, a plunger connected with the toggle arm, means for rocking the crank, and means for imparting reciprocatory movement to said crank.

6. A baling press comprising a plunger, a reciprocatory crank connected with the plunger, a pin on the crank, a pitman pivotally mounted on said pin, a roller carried by said pitman, guides for said roller, and means for rocking said crank at the backward limit of its travel.

7. In a baling press, a plunger having a side member, a reciprocatory crank connected with the plunger, a pin on said crank, a pitman pivoted on said pin, a roller on said pitman supporting the plunger, side guides for the pitman roller, and means for rocking the crank at one limit of its travel.

8. In a baling press, a baling chamber having a suitable bottom, a plunger adapted for reciprocation within the chamber and having side members, a roller fixed at the rear end of the chamber, a pitman, a crank pivotally mounted on the pitman and adapted for reciprocation within the baling chamber, an arm on said crank having a bearing roller adapted for travel on the bottom of the chamber when the crank is advanced or retracted, toggle links connected with said arm and with the plunger, a socket arm on said crank offset from the pitman mounting, one of the members of said arm being adapted for sliding travel on the chamber bottom when the crank is advanced or retracted and the opposite arm for constant engagement with said fixed roller, and means for actuating the pitman for reciprocating said crank and pivoting same on the fixed roller.

9. In a baling press, a baling chamber, a plunger adapted for reciprocation in said chamber, a feeder head, a fixed pivoting member, a reciprocatory crank, means for actuating the crank, and means connecting the crank with the plunger and with the feeder head, whereby the head is moved into the feeding chamber when the plunger is at the rearward limit of its stroke.

10. A baling press comprising a baling chamber having a feed opening, a reciprocatory crank member having a plurality of arms, a plunger having toggle connection with one of the arms, a feeder operatively connected with a second crank arm whereby it is caused to enter and leave the baling chamber between strokes of the plunger, and means for reciprocating said crank member.

11. A baling press comprising a baling chamber, a plunger, a pivotally mounted feeder adapted for movement into and from the baling chamber, a reciprocatory crank having operative connection with the plunger, means about which the crank is adapted to pivot when at the back limit of its reciprocatory travel, and connection between the crank and feeder whereby the feeder is actuated by pivotal movement of the crank.

12. A baling press comprising a baling chamber, a plunger, a pivotally mounted feeder adapted for movement into and from the baling chamber, a reciprocatory crank having operative connection with the plunger, means about which the crank is adapted to pivot when at the back limit of its reciprocatory travel, and connection between the crank and feeder whereby the feeder is actuated by pivotal movement of the crank, and also by reciprocatory movement thereof.

13. A baling press comprising a baling chamber, a plunger, a pivotally mounted feeder adapted for movement into and from the baling chamber, a reciprocatory crank having operative connection with the plunger, means about which the crank is adapted to pivot when at the back limit of its reciprocatory travel, and connection between the crank and feeder whereby the feeder is moved through part of its arc during pivotal movement of the crank and through the remainder of its arc during reciprocatory movement thereof and vice versa, according to the direction of the reciprocatory travel of the crank.

In testimony whereof I affix my signature in presence of two witnesses.

WINFIELD S. LIVENGOOD.

Witnesses:
MYRTLE M. JACKSON,
ARTHUR W. CAPS.

---

Copies of this patent may be obtained for five cents each, by addressing the "Commissioner of Patents, Washington, D. C."